(12) United States Patent
Chiang et al.

(10) Patent No.: US 8,708,686 B2
(45) Date of Patent: Apr. 29, 2014

(54) CLAMPING DEVICE FOR A TWO-PLATEN INJECTION MOLDING MACHINE AND A TWO-PLATEN INJECTION MOLDING MACHINE

(71) Applicant: Chen Hsong Asset Management Limited, Hong Kong (HK)

(72) Inventors: Chi Kin Chiang, Shenzhen (CN); Li Xiong Liu, Shenzhen (CN)

(73) Assignee: Chen Hsong Asset Management Limited, Hong Kong (HK)

( * ) Notice: Subject to any disclaimer, the term of this patent is extended or adjusted under 35 U.S.C. 154(b) by 0 days.

(21) Appl. No.: 13/736,674

(22) Filed: Jan. 8, 2013

(65) Prior Publication Data

US 2013/0337103 A1    Dec. 19, 2013

(30) Foreign Application Priority Data

Jun. 19, 2012  (CN) .......................... 2012 1 0210268

(51) Int. Cl.
  *B29C 45/64*  (2006.01)
(52) U.S. Cl.
  USPC ..................................... 425/192 R; 425/589

(58) Field of Classification Search
  USPC ........................ 425/192 R, 450.1, 589, 595
  See application file for complete search history.

(56) References Cited

U.S. PATENT DOCUMENTS

| | | | | |
|---|---|---|---|---|
| 3,951,579 | A | * | 4/1976 | Myers et al. ................... 425/190 |
| 4,094,621 | A | * | 6/1978 | Hehl .............................. 425/190 |
| 5,338,171 | A | * | 8/1994 | Hayakawa et al. ........... 425/589 |
| 6,960,071 | B2 | * | 11/2005 | Yoshioka ....................... 425/190 |
| 7,371,061 | B2 | * | 5/2008 | Tsuji et al. ..................... 425/190 |
| 8,137,093 | B2 | * | 3/2012 | Furuya et al. ................. 425/190 |

* cited by examiner

*Primary Examiner* — James Mackey
(74) *Attorney, Agent, or Firm* — Muncy, Geissler, Olds & Lowe, P.C.

(57) ABSTRACT

A clamping device for a two-platen injection molding machine, includes a movable mold platen, a stationary mold platen, and a tie bar connected therebetween, with the movable mold platen being movable along the tie bar. The clamping device further includes a connecting structure that is used to detachably connect an elongating tie bar to an end of the tie bar. The tie bar can be elongated as desired and re-machining the whole tie bar is dispensed with, therefore the tie bar can be elongated conveniently, the productivity is increased and the product cost is lowered.

17 Claims, 3 Drawing Sheets

CLAMPING DEVICE FOR A TWO-PLATEN INJECTION MOLDING MACHINE AND A TWO-PLATEN INJECTION MOLDING MACHINE

FIELD OF THE INVENTION

The invention relates to a clamping device for a two-platen injection molding machine, and a two-platen injection molding machine comprising the clamping device.

BACKGROUND OF THE INVENTION

With the development of plastic industry, requirements on plastic items are becoming more and more demanding, such that conventional toggle injection molding machines cannot fulfill these requirements. Two-platen injection molding machines have witnessed widespread use due to their simple structure and low cost. The clamping device used for a two-platen injection molding machine generally comprises a movable mold platen, a stationary mold platen, and a tie bar connected there-between so as to facilitate the movable mold platen to move along the tie bar. The working mechanism of a clamping device for a two-platen injection molding machine is to drive the movable mold platen to move through the mold shift oil cylinder. When the molds are engaged with each other, four mold-clamping oil cylinders pull the movable mold platen to press the molds. The pull force of the mold-clamping oil cylinders overcomes the elastic distortions of the clamping device to generate the mold-clamping force.

In the prior art two-platen injection molding machine, the tie bar functions mainly to connect the movable platen and the stationary platen, and to provide the pull force needed by the clamping device during injection molding. Furthermore, the tie bar guides the movement of the movable mold platen during opening the mold platens. The locating holes of the movable mold platen may be used to support the tie bar and guarantee the location accuracy of the tie bar.

Many present molds have complex structures and a plurality of joint faces, and inserts are needed. All these require a longer mold-opening stroke (that is, the distance between the movable mold platen and the stationary mold platen should be enlarged). In addition, molds for injection molding machines are changed more and more frequently, which necessitates a quick and convenient adjustment of the clamping device for an injection molding machine. In the case of changing a larger mold or requiring a longer mold-opening stroke, it is conventional to remove the standard tie bar, and to re-machine the same number of tie bars whose lengths are desired.

Obviously, in prior art clamping device for a two-platen injection molding machine, a new tie bar has to be machined according to the requirements of the customers. Then the old standard tie bar has to be removed, and the newly machined tie bar is installed to the clamping device. Production, removal of the old tie bar and machining and installation of the new tie bar cost highly in terms of both time and labor, which affects the productivity of the two-platen injection molding machine, results in a long production cycle, and thus increases the production cost.

SUMMARY OF THE INVENTION

In order to overcome the problems associated with the prior art, the invention proposes a novel clamping device for a two-platen injection molding machine, in which the connection of the tie bar is reliable. Thus, production and assembly are convenient, the productivity is increased, and the production cycle is shortened. Specifically, the invention proposes a clamping device to solve the problems in the prior art, wherein the tie bar can be elongated as desired and there is no need to machine the whole tie bar.

In one aspect of the invention, a clamping device for a two-platen injection molding machine is proposed, which comprises a movable mold platen, a stationary mold platen, and a tie bar connected there-between. The movable mold platen is movable along the tie bar. The clamping device further comprises a connecting structure that is used to detachably connect an elongating tie bar to an aft end of the tie bar.

In the above-mentioned aspect, the clamping device may further comprise the elongating tie bar.

In any one of the above-mentioned aspects, the connecting structure may comprise a locating boss formed on the end surface of the aft end of the tie bar; and a locating hole formed on the end surface of the elongating tie bar, which engages with the locating boss.

In any one of the above-mentioned aspects, the connecting structure may further comprise a threaded hole formed on the end surface of the locating boss; a connecting rod, one end of which is threadedly engaged with the threaded hole, and the other end of which passes through the axial through-hole of the elongating tie bar; and fasteners which fasten the elongating tie bar and the tie bar together at the other end.

In any one of the above-mentioned aspects, the connecting structure may further comprise a locating hole formed on the end surface of the aft end of the tie bar and a locating boss formed on the end surface of the elongating tie bar which engages with the locating boss.

In any one of the above-mentioned aspects, the connecting structure may further comprise a threaded hole formed on the bottom surface of the locating hole; a connecting rod, one end of which is threadedly engaged with the threaded hole, and the other end of which passes through the axial through-hole of the elongating tie bar; and fasteners which fastens the elongating tie bar and the tie bar together at the other end.

In any one of the above-mentioned aspects, the connecting structure may further comprise a locking nut which further fastens the one end of the connecting rod into the threaded hole.

In any one of the above-mentioned aspects, the end surface of the locating boss may be formed with a threaded column, and the bottom surface of the locating hole may be formed with a threaded hole which threadedly engages with the threaded column.

In any one of the above-mentioned aspects, the bottom surface of the locating hole may be formed with a threaded hole, and the locating boss on the end surface of the elongating tie bar may be formed with a threaded column which threadedly engages with the threaded hole.

In any one of the above-mentioned aspects, the connecting structure may further comprise at least one locating screw, and the at least one locating screw engages with at least one screw hole that runs through radically and is formed on the circumferential surface of the elongating tie bar corresponding to the locating hole, such that the locating boss is located.

In any one of the above-mentioned aspects, the circumferential surface at the aft end of the tie bar that corresponds to the locating hole may be formed with at least one screw hole that runs through radically, and the screw hole engages with a screw so as to further locate the locating boss.

In any one of the above-mentioned aspects, the elongating tie bar may comprise at least two segments which can be detached with respect to each other.

In any one of the above-mentioned aspects, the aft end and the elongating tie bar constitute a guiding segment of the tie bar which does not bear the pull force, and functions only for guidance.

In any one of the above-mentioned aspects, the tie bar may further comprise a thread segment that bears the pull force.

In any one of the above-mentioned aspects, there may be designed with four tie bars, and the movable mold platen is designed with a same number of locating holes to support the tie bars. Certainly the number of the tie bars may be greater or less than four. The number of the locating holes in the movable mold platen may be greater or less than four accordingly.

In another aspect of the invention, it is proposed a two-platen injection molding machine, comprising the clamping device for a two-platen injection molding machine according to any of the above aspects.

In a further aspect of the invention, it is proposed a two-platen injection molding machine, comprising the clamping device for a two-platen injection molding machine according to any of the above aspects, wherein the elongating tie bar comprises a plurality of elongating tie bars of different lengths.

In the clamping device for a two-platen injection molding machine according to the first aspect of the invention, since the clamping device is designed with a connecting structure used to connect the elongating tie bar to the tie bar, there is no need to re-machine a new tie bar or to remove the tie bar in the case that a longer tie bar is desired, and thus removing the elongating tie bar and substituting a longer elongating tie bar can fulfill the purpose. Therefore, as compared to the conventional clamping device, the clamping device according to the invention facilitates the assembly of the tie bar, saves time and labor, increases the productivity and decreases the production cost.

In the clamping device for a two-platen injection molding machine according to other aspects of the invention, since the connecting structure is located on the tie bar and the elongating tie bar, the tie bar can be elongated as desired, without re-machining the whole tie bar. Therefore, the production cost is decreased, and the production cycle is shortened.

In the two-platen injection molding machine according to the invention, since the clamping device thereof comprises a tie bar and a plurality of elongating tie bar of different lengths, the tie bar can be elongated as desired, without re-machining the whole tie bar. Therefore, the production cost is decreased, and the production cycle is shortened. Thus the same technical effects can be achieved.

The other aspects, characteristics and advantages of the invention will be illustrated from the following detailed descriptions with reference to the accompanying figures.

BRIEF DESCRIPTION OF THE DRAWINGS

Hereinafter the invention will be further described with reference to the embodiments and the accompanying figures, wherein.

DETAILED DESCRIPTION

Figure 1:
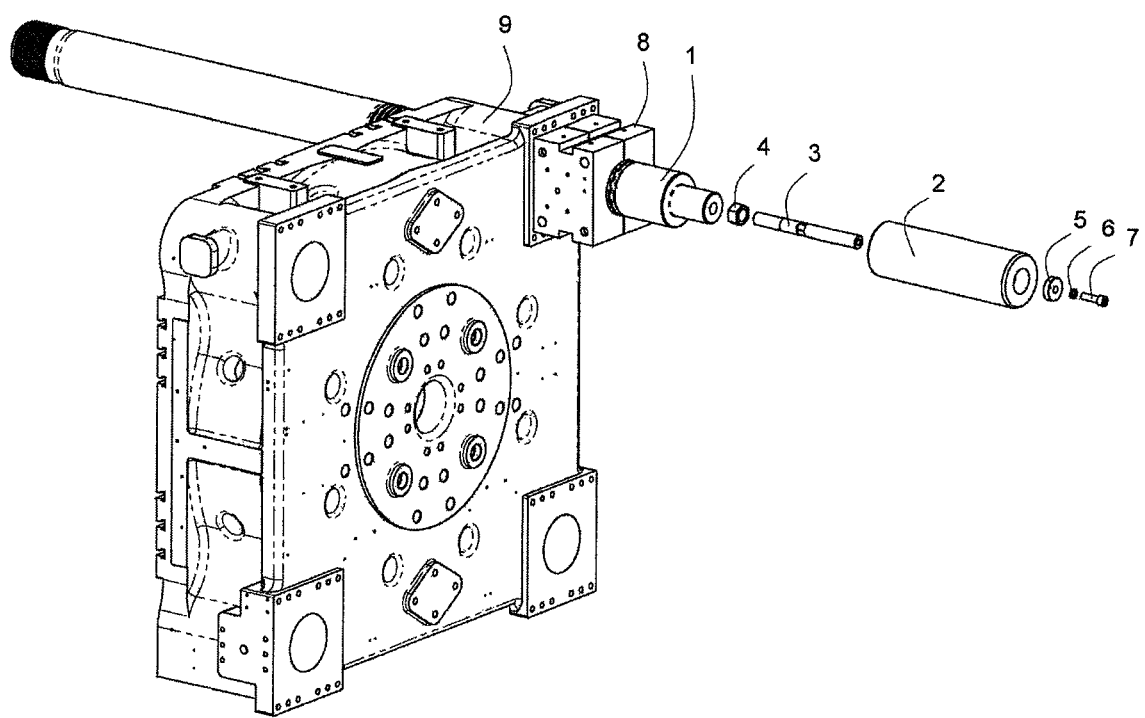
FIG. 1 is a perspective view illustrating a part of a clamping device for a two-platen injection molding machine according to an embodiment of the invention.

The embodiments according to the invention will be described with reference to the accompanying figures. The same reference numerals in all figures refer to the same elements.

Figure 2:
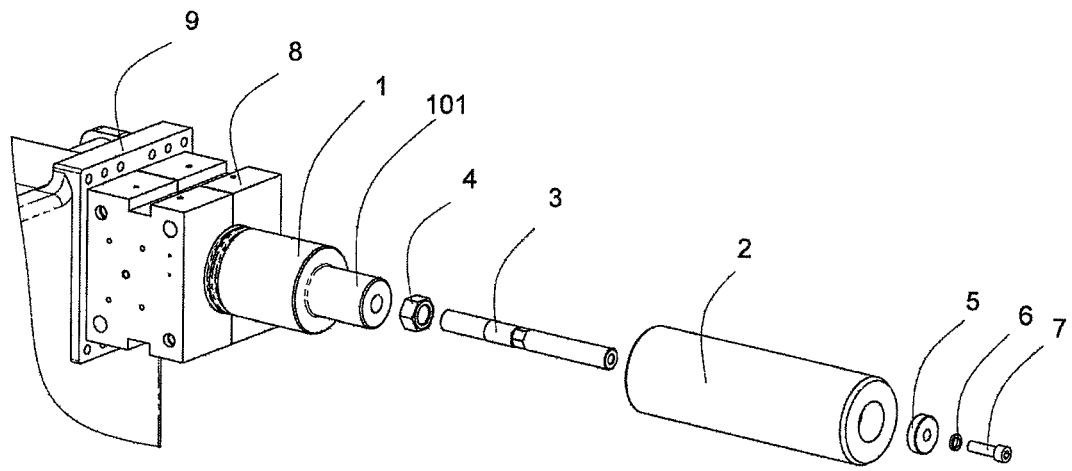
FIG. 2 is a perspective view illustrating a part of a clamping device for a two-platen injection molding machine according to an embodiment of the invention.
Figure 3:
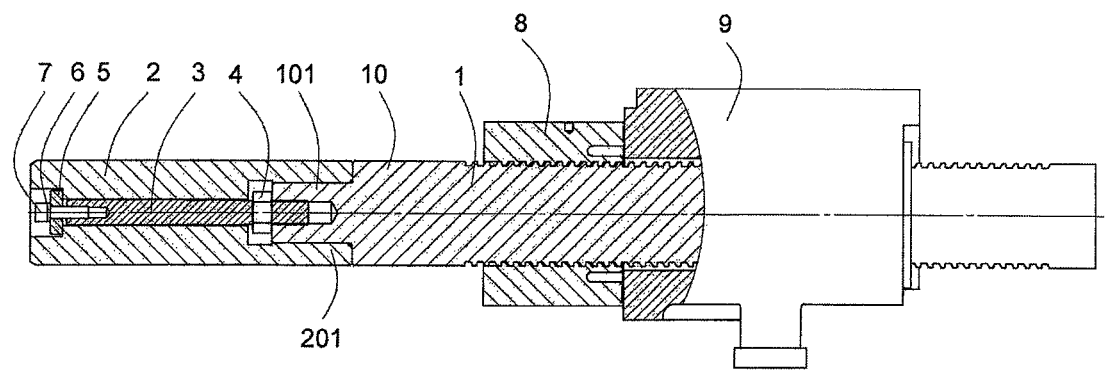
FIG. 3 is a sectional view illustrating an example of the connecting structure for an elongating tie bar of the clamping device for a two-platen injection molding machine according to an embodiment of the invention.

FIG. 1 is a perspective view illustrating a part of a clamping device for a two-platen injection molding machine according to an embodiment of the invention, FIG. 2 is a perspective view illustrating the tie bar and the elongating tie bar according to the invention, and FIG. 3 is a sectional view. As shown in the figures, the clamping device for a two-platen injection molding machine substantially comprises a movable mold platen 9, a stationary mold platen (not shown in figures) and a tie bar 1. The movable mold platen 9 is designed with 4 locating holes at 4 corners thereof which engaged with the tie bar 1, such that the movable mold platen 9 is movable on the tie bar 1. Meanwhile, the movable mold platen 9 supports the tie bar 1 by means of the locating holes so as to prevent the tie bar 1 from dropping downwards. FIG. 1 schematically illustrates only one tie bar 1 and four locating holes; however, the clamping device as shown in FIG. 1 actually comprises four same tie bars 1. The number of the tie bar 1 is the same as the number of the locating holes in the movable mold platen 9. Even though the movable mold platen 9 as shown in FIG. 1 comprises four locating holes (and four tie bars 1 accordingly), different numbers of locating holes and tie bars 1 are also acceptable. For example, the number of locating holes and tie bars 1 is less than four, or is greater than four.

The stationary mold platen, not shown in FIG. 1, is to the left of the tie bar 1 shown in FIG. 1, and is connected with the tie bar 1. The stationary mold platen may be designed with a clamping means (not shown) which imposes a pull force on the tie bar 1, e.g., a mold clamping oil cylinder. In addition, the movable mold platen 9 is designed with a moving means (not shown), such as an mold moving oil cylinder. The tie bar 1 is designed with split nuts 8 at the location approaching to the end thereof. The split nuts 8 is engaged with threads formed on the thread segment of the tie bar 1 so as to provide the clamping force during clamping. During operating, the split nuts 8 are clamped; then the moving means (such as an mold moving oil cylinder) drives the movable mold platen 9 to move along the tie bar 1 toward the stationary mold platen; after the molds (not shown) are engaged, the clamping means (such as a mold clamping oil cylinder) imposes a push force on the movable mold platen 9 by means of the tie bar 1 and the split nuts 8, in this way the molds are clamped.

Structures of the movable mold platen 9, the stationary mold platen, the split nuts 8, the moving means and the clamping means are well-known in the technical field, and therefore descriptions thereof are omitted.

In addition, the end of the tie bar 1 that is installed with the stationary mold platen is herein referred to as the fore end; and the other end is referred to as the aft end. In the clamping device for an injection molding machine as shown in FIG. 1, it is well known to the skilled in the art that the tie bar 1 may be divided into two portions, that is, a thread segment that bears the pull force and a guiding segment (designated with reference numeral 10) that functions for guidance only and does not receive the pull force. The thread segment is used to endure the pull force during clamping. The guiding segment is used to guide the movable mold platen 9 during mold opening, and is supported by the movable mold platen 9 so as to prevent the tie bar 1 from dropping downwards.

As mentioned in the Background, the tie bar of the prior art clamping device for the two-platen injection molding machine cannot be elongated. In the case that a longer tie bar is desired, a new tie bar should be machined; that is, the old tie bar is removed from the clamping device, and the newly machined tie bar is then installed on the clamping device; in this way the tie bar is customized. Obviously, machining and installation of the new tie bar, as well as removal of the old tie bar cost more time and more labor, and therefore lead to a longer production cycle, a higher cost and a lower productivity.

It is found by the inventor that, as for the tie bar of the clamping device for a two-platen injection molding machine, only the thread segment that is engaged with the movable mold platen and the stationary mold platen receives the pull force; and the aft end of the tie bar does not bear the pull force at all. It is used only for guiding.

Therefore, as shown in FIGS. 1-3, the clamping device for a two-platen injection molding machine according to the invention additionally comprises an elongating tie bar 2 used for elongating the tie bar 1. The elongating tie bar 2 is connected to the aft end of the tie bar 1 through a connecting structure. Thus, the tie bar 1 can be customized to assume different lengths as desired by the customers through connecting the elongating tie bars of different lengths to the tie bar 1. The elongating tie bar 2 has identical outer diameter as the tie bar 1.

In the embodiments shown in FIGS. 1-3, the end surface at the aft end of the tie bar 1 is formed with a locating boss 101. The end surface of the elongating tie bar 2 that is opposite to the end surface at the aft end of the tie bar 1 is formed with a locating hole 201 which engages with the locating boss 101. The locating boss 101 and the locating hole 201 may assume shapes such as cylinder, polygon, taper, or any other suitable shapes. Preferably the boss 101 and the locating hole 201 assume a cylinder shape, since the cylinder shape facilitates machining and assembly. The locating boss 101 may also assume a frustoconic shape taping toward the end; meanwhile the locating hole 201 should assume a shape which is complementary to the frustoconic shape of the locating boss 101. The sizes of the locating boss 101 and the locating hole 201 should satisfy the locating requirements for the tie bar 1 and the elongating tie bar 2, that is, the locating boss 101 and the locating hole 201 should be fitted with each other subject to certain coaxiality. In addition, it is preferable that the length of the locating boss 101 in the longitudinal direction (the longitudinal axial direction of the tie bar 1 in FIG. 1) is less than the longitudinal length of the locating hole 201, such that the end surfaces of the elongating tie bar 2 and the tie bar 1 can contact with each other tightly. The elongating tie bar 2 and the tie bar 1 may be made of same metal material, or be made of different metal materials or other materials (such as plastic materials).

In addition, the fitting of the locating boss 101 and the locating hole 201 should ensure that the elongating tie bar 2 be removed from the tie bar 1 if necessary, i.e., the fitting of the locating boss 101 and the locating hole 201 is a detachable engagement.

As shown in FIG. 3, the end surface of the locating boss 101 may be further formed with a threaded hole that may be used for connect the elongating connecting rod 3. In this case, it is preferable that the longitudinal length of the locating hole 201 is larger than that of the locating boss 101, for example, by a length which is larger than the width of at least one locking nut 4. Thus, the locking nut 4 can be additionally used to fasten the connecting rod 3 into the threaded hole of the tie bar 1 during inserting the connecting rod 3 with a thread at one end thereof into the threaded hole. As shown in FIG. 3, the elongating tie bar 2 is further designed with an axial through hole that runs therethrough, such that the other end of the connecting rod 3 can pass through the axial through hole. The diameter of the axial through hole should match the diameter of the connecting rod. In FIG. 3, the left end of the axial through hole may be formed with a groove with an enlarged diameter, and the other end of the connecting rod 3 is further formed with a threaded hole. Thus, as shown in FIG. 3, the connecting rod 3 may be fastened to the elongating tie bar 2 through a washer 5, a spring washer 6 and a bolt 7 that are located within the groove, such that the elongating tie bar 2 and the tie bar 1 are connected together as a unity. The bolt 7 is a hexagon socket head bolt preferably; nevertheless, it may be any other suitable bolts.

Alternatively, the other end of the connecting rod 3 may be formed with external threads. In this case, the axial through hole may directly run therethrough, without being formed with a groove in an enlarged diameter. In this way, the connecting rod 3 can be fastened to the elongating tie bar 2 by means of a washer and a locking nut such that the elongating tie bar 2 and the tie bar 1 are connected together as a unity.

In addition, the elongating tie bar 2 may be formed with at lease one screw hole (not shown) that runs therethrough radially at its circumferential surface corresponding to the locating hole 201. In this way, a screw can be used to further locate the locating boss 101 so as to enhance the connection rigidity of the elongating tie bar 2 and the tie bar 1.

The procedure of installing the elongating tie bar 2 will be described hereinafter with the example of the clamping device as shown in FIGS. 1-3.

First, the locating boss 101 is machined at the end of the tie bar 1; and the threaded hole is threaded at the end surface of the locating boss 101. Second, the connecting rod 3 with a screw hole at one end thereof is threadedly engaged into the threaded hole of the locating boss 101. Preferably, the connecting rod 3 is further fastened by means of the locking nut 4 so as to prevent the connecting rod 3 from loosing. Third, the elongating tie bar 2 is sleeved over the connecting rod 3; meanwhile the locating boss 101 of the tie bar 1 is engaged into the locating hole 201 of the elongating tie bar 2 so as to be located. Then, the connecting rod 3 is fastened to the elongating tie bar 2 by means of the washer 5, the bolt 7 and the spring washer 6, in this way the elongating tie bar 2 and the tie bar 1 are fastened and connected together as a unity. The end of the tie bar 1 and the elongating tie bar 2 constitute the guide segment that does not bear the pull force and functions only to guide the movable mold platen 9. As shown in FIG. 3, the threaded portion of the tie bar 1 constitutes the thread segment thereof that receives the pull force.

In the embodiment according to the invention as shown in FIG. 1, in the case that a longer tie bar 1 is needed (for example, the distance between the movable mold platen 9 and the stationary mold platen is required to be enlarged, the stroke of the movable mold platen 9 is accordingly enlarged, and thus a longer tie bar 1 is desired), the elongating tie bar 2 can be removed in a procedure reverse to the above-mention procedure, and then another elongating tie bar 2 of desired length can be installed to the tie bar 1 according to the procedure, without re-machining and re-installing a new tie bar. Therefore, as compared to the case employing the conventional clamping device, only additional parts are needed to be installed in the case of employing the clamping device according to the invention, thus time and labor are saved, productivity is increased, production cycle is shortened and production cost is considerably decreased.

In addition, since the elongating tie bar 2 does not bear the pull force and functions only for guidance, it can be made of material which is cheaper than the material of the tie bar 1. Thus the production cost may be further decreased.

Figure 4:
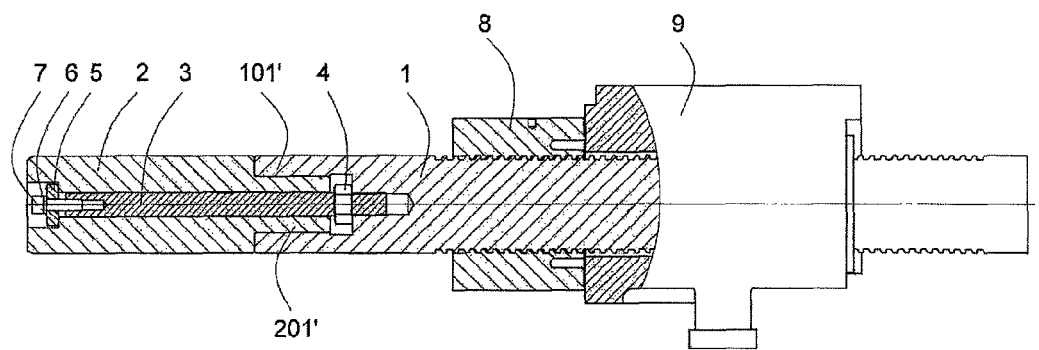
FIG. 4 is a sectional view illustrating an example of the connecting structure for an elongating tie bar of the clamping device for a two-platen injection molding machine according to another embodiment of the invention.

Another embodiment according to the invention will be described with reference to FIG. 4. The difference between the embodiment as shown in FIG. 4 and the embodiment as shown in FIGS. 1-3 lies in the fact that the locations of the locating boss and the locating hole are interchanged. As shown in FIG. 4, the end surface of the aft end of the tie bar 1 has no locating boss; instead, it is formed with a locating hole 101'. Accordingly, the end surface of the elongating tie bar 2 that is opposite to the end surface of the aft end of the tie bar 1 has no locating hole; instead, it is formed with a locating boss 201'. The locating boss 201' is fitted into the locating hole 101', and thus the elongating tie bar 2 is located to the tie bar 1 and the concentricity therebetween is guaranteed. Preferably, the longitudinal length of the locating hole 101' is larger than that of the locating boss 201' by a length which is larger than the width of at least one nut such that the locking nut 4 can be used to further fasten the connecting rod 3 into the threaded hole that is formed on the bottom surface of the locating hole 101'. The other aspects of the embodiment as shown in FIG. 4 are similar to those of the embodiment as shown in FIG. 1, and therefore are omitted.

Figure 5:
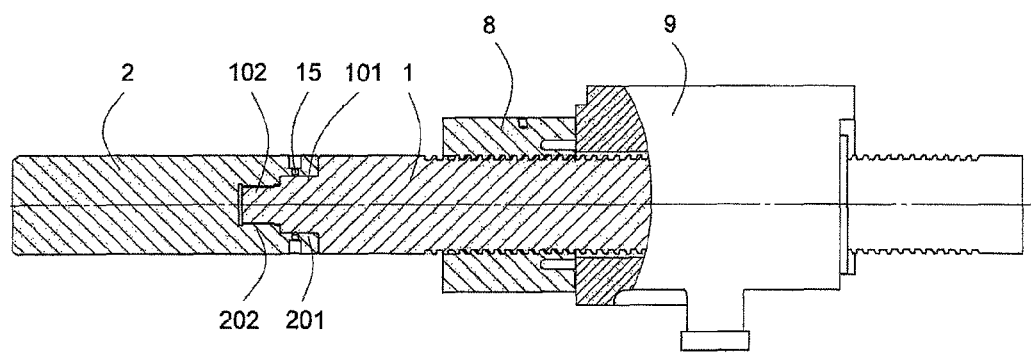
FIG. 5 is a sectional view illustrating an example of the connecting structure for an elongating tie bar of the clamping device for a two-platen injection molding machine according to a further embodiment of the invention.

FIG. 5 illustrates a clamping device according to another embodiment of the invention. In this embodiment, the aft end of the tie bar 1 is formed with a locating boss 101, and the end surface of the locating boss 101 is formed with a threaded column 102. Correspondingly, the end surface of the elongating tie bar 2 that is opposite to the aft end of the tie bar 1 is formed with a locating hole 202, and the bottom surface of the locating hole 202 is formed with a threaded hole 202 that engages with the threaded column 102 of the tie bar 1. The locating boss 101 and the locating hole 201 are used to locate the elongating tie bar 2 to the tie bar 1 so as to ensure the concentricity therebetween. As mentioned above, when the elongating tie bar 2 is fitted to the tie bar 1, the aft end of the tie bar 1 and the elongating tie bar 2 constitute a guide segment that does not bear the pull force and functions only for guiding the movable mold platen 9. The other portion of the tie bar 1 constitutes a thread segment that bears the pull force.

In the embodiment as shown in FIG. 5, in order to further enhance the connection rigidity of the elongating tie bar 2 and the tie bar 1, the circumferential surface of the elongating tie bar 2 that is corresponding to its locating hole 201 may be formed with at least one screw hole 15 running therethrough radically. The locating boss 101 is located through threading a screw into the screw hole so as to further enhance the connection rigidity of the elongating tie bar 2 and the tie bar 1. The embodiment as shown in FIG. 5 results in the same effects as the embodiment shown in FIGS. 1-3.

Figure 6:
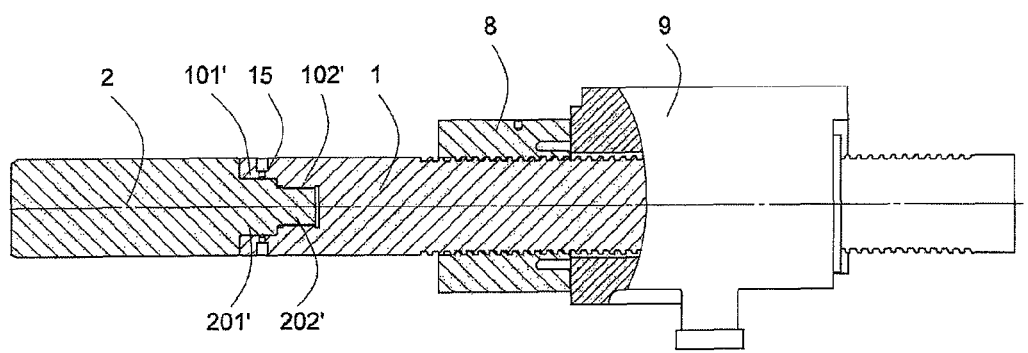
FIG. 6 is a sectional view illustrating an example of the connecting structure for an elongating tie bar of the clamping device for a two-platen injection molding machine according to a still further embodiment of the invention.

FIG. 6 illustrates another embodiment of the invention. The difference between the embodiment as shown in FIG. 6 and the embodiment as shown in FIG. 5 lies in the fact that the locations of the locating boss and the locating hole are interchanged. As shown in FIG. 6, the end surface of the elongating tie bar 2 that is opposite to the end of the tie bar 1 is formed with a locating boss 201', and the end surface of the tie bar 1 is formed with a locating hole 101'. The locating boss 201' of the elongating tie bar 2 is fitted into the locating hole 101' of the tie bar 1, and thus the elongating tie bar 2 is located to the tie bar 1 and the concentricity therebetween is guaranteed.

In addition, as shown in FIG. 6, the end surface of the locating boss 201' of the elongating tie bar 2 is further formed with a threaded column 202'. Correspondingly, the end surface of the locating hole 101' of the tie bar 1 is formed with a threaded hole 102' that is to be engaged with the threaded column 202'. The connection rigidity between the elongating tie bar 2 and the tie bar 1 may be further enhanced through threading the threaded column 202' into the threaded hole 102.

Advantageously, the circumferential surface of the end of the tie bar 1 is formed with at least one screw hole 15 at the location corresponding to its locating hole 101'. In this way, the locating boss of the tie bar 1 may be further located and the connection rigidity between the elongating tie bar 2 and the tie bar 1 can be further enhanced through engaging suitable screw (not shown in figures) into the screw hole.

In the embodiments as shown in FIGS. 5 and 6, as compared to the cases shown in FIGS. 1-3, it is easier to install the elongating tie bar. In the case that a longer tie bar 1 is desired, the elongating tie bar 2 is removed from the tie bar 1, and a longer elongating tie bar 2 is installed. Specifically, the radial screw (not shown) is removed first; and the elongating tie bar 2 is then screwed and removed from the tie bar 1. Then a new elongating tie bar 2 is installed to the end of the tie bar 1. The installation procedure of a new longer elongating tie bar 2 is reverse to the above-mentioned removal process. In the embodiments as shown in FIGS. 5-6, the other end of the elongating tie bar 2 (the left side as shown in the figures, that is, the end opposite to the end engaged with the tie bar 1) is preferably formed with a portion (not shown) to engage with a spanner, such as a boss or a groove with a polygonal cross-section, so as to facilitate the removal and installation of the elongating tie bar 2.

In all embodiments mentioned above, when it is elongated, the tie bar 1 comprises two portions, that is, a guide segment that is constituted by the aft end of the tie bar 1 and the elongating tie bar 2, functions only for guidance and does not bear the pull force, and a thread segment that is constituted by the other portion and bears the pull force. Since the elongating tie bar 2 is connected with the aft end of the tie bar 1, and is located through the aft end, the aft end of tie bar 1 may be referred as the locating segment herein. As mentioned above, the locating segment bears no pull force during the procedure, and only functions for guiding the movable mold platen 9.

Additionally, it is obvious from the above descriptions and figures that all tie bars 1 and elongating tie bars 2 between the movable mold platen 9 and the stationary mold platen may assume the above structures. The connecting structures between all (for example, four) tie bars 1 and elongating tie bars 2 may be same, or different; that is, all of them may assume a structure as shown in FIGS. 1-6, or alternatively, some of them assume one structure as shown in FIGS. 1-6, and some of them assume another structure as shown in FIGS. 1-6. All these means fall within the scope of the invention and lead to similar effects.

In addition, the above descriptions take as the example of the clamping device in which the mold clamping oil cylinder is located at one side of the stationary mold platen (wherein the clamping oil cylinder pulls the tie bar 1, and the clamping force results from pulling the movable mold platen 9 toward the stationary mold platen through split nuts 8). However the invention is not limited thereto. For example, the principle of the invention may apply to the clamping device in which the mold clamping oil cylinder is located at one side of movable mold platen 9 (in which case the clamping oil cylinder directly push the movable mold platen 9). In this case, the elongating tie bar may similarly be detachably connected to the aft end of the tie bar that functions only for guidance and does not bear the pull force. Thus, the elongating tie bar and the aft end of the tie bar, after being connected, constitute a guide segment that functions only for guidance and does not bear the pull force; and the other portion of the tie bar constitutes a thread segment that bears the pull force (or, a portion that bears the pull force through other means).

Some embodiments are illustrated hereinbefore for the purpose of explaining and describing the invention. These embodiments are illustrative, and are not intended to limit the invention by any means. For example, according to teaching of the invention, the tie bar and the elongating tie bar may be detachably connected with each other through other complementary structures such that the tie bar can be elongated as desired without being removed. The scope of the invention is defined by the claims and the equivalent thereof.

What is claimed is:

1. A clamping device for a two-platen injection molding machine, the device comprising:
   a movable mold platen;
   a stationary mold platen;
   a tie bar connected between the movable mold platen and the stationary mold platen, the movable mold platen being movable along the tie bar; and
   a connecting structure that is configured to detachably connect an elongating tie bar to an aft end of the tie bar.

2. The clamping device for a two-platen injection molding machine according to claim 1, wherein the clamping device further comprises an elongating tie bar.

3. The clamping device for a two-platen injection molding machine according to claim 2, wherein the connecting structure comprises a locating boss formed on an end surface of the aft end of the tie bar, and wherein a locating hole formed in an end surface of the elongating tie bar engages with the locating boss.

4. The clamping device for a two-platen injection molding machine according to claim 3, wherein, the connecting structure further comprises:
   a threaded hole formed in an end surface of the locating boss;
   a connecting rod, one end of which is threadedly engaged with the threaded hole, and the other end of which passes through an axial through-hole of the elongating tie bar; and
   fasteners adapted to fasten the elongating tie bar and the tie bar together at the other end of the connecting rod.

5. The clamping device for a two-platen injection molding machine according to claim 2, wherein, the connecting structure comprises:
   a locating hole formed in an end surface of the aft end of the tie bar; and
   a locating boss formed on an end surface of the elongating tie bar which engages with the locating hole.

6. The clamping device for a two-platen injection molding machine according to claim 5, wherein the connecting structure further comprises:
   a threaded hole formed in a bottom surface of the locating hole;
   a connecting rod, one end of which is threadedly engaged with the threaded hole, and the other end of which passes through an axial through-hole of the elongating tie bar; and
   fasteners adapted to fasten the elongating tie bar and the tie bar together at the other end.

7. The clamping device for a two-platen injection molding machine according to claim 4, wherein, the connecting structure further comprises a locking nut that further fastens the one end of the connecting rod into the threaded hole.

8. The clamping device for a two-platen injection molding machine according to claim 4, wherein, the end surface of the locating boss is formed with a threaded column, and a bottom surface of the locating hole is formed with a threaded hole which threadedly engages with the threaded column.

9. The clamping device for a two-platen injection molding machine according to claim 5, wherein, a bottom surface of the locating hole is formed with a threaded hole, and wherein the locating boss on the end surface of the elongating tie bar is formed with a threaded column which threadedly engages with the threaded hole.

10. The clamping device for a two-platen injection molding machine according to claim 8, wherein, the connecting structure further comprises at least one locating screw, wherein the at least one locating screw engages with at least one screw hole that runs through radially and is formed on a circumferential surface of the elongating tie bar corresponding to the locating hole.

11. The clamping device for a two-platen injection molding machine according to claim 9, wherein, a circumferential surface at the aft end of the tie bar that corresponds to the locating hole is formed with at least one screw hole that runs through radially, and the screw hole engages with a screw.

12. The clamping device for a two-platen injection molding machine according to claim 1, wherein, the elongating tie bar comprises at least two segments which are adapted to be detachable with respect to each other.

13. The clamping device for a two-platen injection molding machine according to claim 1, wherein, the aft end and the elongating tie bar constitute a guiding segment of the tie bar which does not endure a pull force, and functions only for guidance.

14. The clamping device for a two-platen injection molding machine according to claim 1, wherein, the tie bar further comprises a thread segment that bears a pull force.

15. The clamping device for a two-platen injection molding machine according to claim 1, wherein, the device comprises four tie bars, and the movable mold platen is designed with a same number of locating holes to support the tie bars.

16. A two-platen injection molding machine, comprising the clamping device for a two-platen injection molding machine according to claim 1.

17. A two-platen injection molding machine, comprising the clamping device for a two-platen injection molding machine according to claim 1, wherein the elongating tie bar comprises a plurality of elongating tie bars of different lengths.

* * * * *